US011734698B2

(12) United States Patent
Klein et al.

(10) Patent No.: US 11,734,698 B2
(45) Date of Patent: Aug. 22, 2023

(54) SYSTEM AND METHOD FOR TIERED PRICING FOR SCARCE COMMODITIES

(71) Applicant: Climate Karma Solutions Inc., Henderson, NV (US)

(72) Inventors: Mark Klein, Henderson, NV (US); Wendell Brown, Henderson, NV (US)

(73) Assignee: CLIMATE KARMA SOLUTIONS INC., Henderson, NV (US)

( * ) Notice: Subject to any disclaimer, the term of this patent is extended or adjusted under 35 U.S.C. 154(b) by 0 days.

(21) Appl. No.: 17/813,712

(22) Filed: Jul. 20, 2022

(65) Prior Publication Data

US 2022/0351214 A1   Nov. 3, 2022

Related U.S. Application Data

(63) Continuation-in-part of application No. 17/109,588, filed on Dec. 2, 2020, now Pat. No. 11,461,845.
(Continued)

(51) Int. Cl.
*G06Q 30/018* (2023.01)
*G06Q 30/0283* (2023.01)
(Continued)

(52) U.S. Cl.
CPC .......... *G06Q 30/018* (2013.01); *G06Q 20/202* (2013.01); *G06Q 20/204* (2013.01);
(Continued)

(58) Field of Classification Search
CPC ..... G06Q 20/206; G06Q 20/202; G06Q 20/24; G06Q 20/085; G06Q 20/204;
(Continued)

(56) References Cited

U.S. PATENT DOCUMENTS 5,519,622 A * 5/1996 Chasek ............... G01R 22/00
705/412
6,904,336 B2 * 6/2005 Raines ............... G06Q 50/06
705/401
(Continued)

FOREIGN PATENT DOCUMENTS

AU   2007216768 A1   4/2009
AU   2010330657 A1 * 8/2012 ............ G06Q 10/00
(Continued)

OTHER PUBLICATIONS

S. T. Lee, "An Effective Pricing and Financial Method to Significantly Reduce CO2 Emissions from Electricity Production—An Application of the Third Way Economic System of Unity-in-Diversity," 2006 International Conference on Power System Technology, 2006, pp. 1-8, doi: 10.1109/ICPST.2006.321934. (Year: 2006).*
(Continued)

*Primary Examiner* — Ashford S Hayles
(74) *Attorney, Agent, or Firm* — Manatt, Phelps & Phillips, LLP

(57) ABSTRACT

A system and method for tiered pricing for any scarce commodity, such as petroleum products or food stuffs, may be used to ration the scarce commodity. The system and method may use a dual currency transaction system to manage the rationing. In the use case for gas or oil as the scarce commodity, the dual currency system and method and the tiered pricing may also reduce carbon emissions into the atmosphere by charging both a monetary price and a carbon price for a product or service wherein the carbon price for each purchasable item (good or service) may correspond to a number of Kg of Co2 emitted by the manufacture/sale/use of the purchasable item.

18 Claims, 7 Drawing Sheets

Related U.S. Application Data

(60) Provisional application No. 62/942,764, filed on Dec. 3, 2019.

(51) Int. Cl.
| | | |
|---|---|---|
| G06Q 20/20 | (2012.01) | |
| G06Q 20/34 | (2012.01) | |
| G06Q 20/40 | (2012.01) | |
| G06Q 30/0601 | (2023.01) | |
| G06Q 40/02 | (2023.01) | |
| G06Q 40/04 | (2012.01) | |
| G06Q 50/26 | (2012.01) | |

(52) U.S. Cl.
CPC ....... *G06Q 20/346* (2013.01); *G06Q 20/4037* (2013.01); *G06Q 30/0283* (2013.01); *G06Q 30/0633* (2013.01); *G06Q 30/0641* (2013.01); *G06Q 40/02* (2013.01); *G06Q 40/04* (2013.01); *G06Q 50/265* (2013.01)

(58) Field of Classification Search
CPC ............. G06Q 20/326; G06Q 20/3274; G06Q 20/3674; G06Q 20/38215; G06Q 20/385; G06Q 20/409
See application file for complete search history.

(56) References Cited

U.S. PATENT DOCUMENTS

| | | | |
|---|---|---|---|
| 10,504,179 B1 | 12/2019 | McGuire | |
| 2002/0143616 A1 | 1/2002 | Hajdukiewicz | |
| 2002/0143693 A1 | 10/2002 | Soestbergen | |
| 2002/0173979 A1* | 11/2002 | Daggett | G06Q 10/10 705/317 |
| 2004/0158478 A1* | 8/2004 | Zimmerman | G06Q 10/04 705/1.1 |
| 2005/0154669 A1 | 1/2005 | Streetman | |
| 2006/0089851 A1* | 4/2006 | Silby | G06Q 40/00 705/500 |
| 2006/0095356 A1 | 5/2006 | Koornstra | |
| 2007/0255457 A1 | 1/2007 | Whitcomb | |
| 2007/0233616 A1* | 10/2007 | Richards | G06Q 10/06 705/400 |
| 2008/0228632 A1 | 1/2008 | Gotthelf | |
| 2008/0208486 A1 | 8/2008 | Natunen | |
| 2008/0319819 A1* | 12/2008 | Clayton | G06Q 30/0206 705/400 |
| 2009/0157510 A1 | 1/2009 | Pridmore | |
| 2009/0187493 A1 | 1/2009 | Whiteman | |
| 2009/0076941 A1* | 3/2009 | Schneierson | G06Q 20/10 705/37 |
| 2009/0210295 A1* | 8/2009 | Edholm | G06Q 10/06393 705/1.1 |
| 2009/0228320 A1* | 9/2009 | Lopez | G06Q 40/02 705/14.1 |
| 2009/0292617 A1 | 11/2009 | Sperling et al. | |
| 2010/0145833 A1 | 1/2010 | Hamilton, II | |
| 2010/0063902 A1 | 3/2010 | Constantz | |
| 2010/0131343 A1 | 5/2010 | Hamilton, II | |
| 2010/0145743 A1* | 6/2010 | Colquhoun | G07F 17/0014 705/317 |
| 2010/0228601 A1* | 9/2010 | Vaswani | G06Q 10/30 705/308 |
| 2010/0235293 A1* | 9/2010 | Zimmerman | G06Q 10/10 705/317 |
| 2010/0257124 A1 | 10/2010 | Srinivasan | |
| 2010/0274657 A1* | 10/2010 | Workman | G06Q 30/00 705/14.29 |
| 2011/0208621 A1 | 1/2011 | Feierstein | |
| 2011/0213690 A1 | 1/2011 | Ghosh | |
| 2012/0095897 A1 | 1/2012 | Barrow | |
| 2012/0101934 A1* | 4/2012 | Lindores | G06Q 10/06312 705/37 |
| 2013/0159188 A1 | 6/2013 | Andon | |
| 2014/0155148 A1 | 1/2014 | Wrightsil | |
| 2014/0089073 A1 | 3/2014 | Jacobs | |
| 2015/0081411 A1 | 3/2015 | Tucker | |
| 2016/0155130 A1 | 1/2016 | Kale | |
| 2016/0034910 A1* | 2/2016 | Davis | G06Q 20/3224 705/14.27 |
| 2019/0005578 A1 | 1/2019 | Gagne | |
| 2019/0108516 A1 | 1/2019 | Jawaharlal | |
| 2022/0270112 A1* | 8/2022 | Sahara | C10G 3/00 |

FOREIGN PATENT DOCUMENTS

| | | | | |
|---|---|---|---|---|
| CA | 2717164 A1 | 9/2009 | | |
| CA | 2700644 A1 | 3/2010 | | |
| CN | 102663607 A | 9/2012 | | |
| CN | 104471609 A | 3/2015 | | |
| CN | 104766237 A | 7/2015 | | |
| CN | 105550792 A * | 5/2016 | | |
| GB | 2470216 A | 11/2010 | | |
| JP | 2009087317 A | 4/2009 | | |
| KR | 101070607 B1 | 2/2012 | | |
| KR | 20120011350 A | 2/2012 | | |
| KR | 101433290 B1 * | 8/2014 | | |
| KR | 101709761 B1 | 2/2017 | | |
| TW | I592895 B | 7/2017 | | |
| TW | M546551 U | 8/2017 | | |
| WO | WO-2008038295 A | 4/2008 | | |
| WO | WO-2008082631 A1 * | 7/2008 | | G06Q 30/00 |
| WO | WO-2009062108 A1 * | 5/2009 | | G06Q 10/00 |
| WO | WO-2009155496 A1 | 12/2009 | | |
| WO | WO-2011029142 A1 | 3/2011 | | |
| WO | WO-2013010160 A1 | 1/2013 | | |
| WO | WO-2013029108 A2 * | 3/2013 | | G06Q 20/28 |

OTHER PUBLICATIONS

N. Ahner, "Economisation of European Environmental law—Emissions Trading as legal instrument (Dec. 2008)," 2009 6th International Conference on the European Energy Market, 2009, pp. 1-8, doi: 10.1109/EEM.2009.5207191. (Year: 2008).*
J. Acharya and R. D. Yates, "A price based dynamic spectrum allocation scheme," 2007 Conference Record of the Forty-First Asilomar Conference on Signals, Systems and Computers, 2007, pp. 797-801, doi: 10.1109/ACSSC.2007.4487326. (Year: 2007).*
Saglam, Y. (2010). Water scarcity and optimal pricing of water (Order No. 3422191). Available from ProQuest Central; ProQuest Dissertations & Theses Global. (755297135). Retrieved from https://www.proquest.com/dissertations-theses/water-scarcity-optimal-pricing/docview/755297135/se-2 (Year: 2010).*
Tyagi, N.K. Managing Water-Energy-Food Security Nexus Under Changing Climate: Implementation Challenges and Opportunities in India. Trans Indian Natl. Acad. Eng. 5, 449-464 (2020). https://doi.org/10.1007/s41403-020-00117-7 (Year: 2020).*
Hepburn, Cameron. "Regulation by Prices, Quantities, or Both: A Review of Instrument Choice." Oxford review of economic policy 22.2 (2006): 226-247. Web. (Year: 2006).*
I. Satoh, "Low-Cost Carbon Offsetting and Trading," 2012 IEEE International Conference on Green Computing and Communications, 2012, pp. 549-556, doi: 10.1109/GreenCom.2012.88., 8 pages.
X. He, W. Qi and X. Tang, "Optimal Pricing and Carbon Emission Abatement Allocation Decisions in Supply Chains With Option Contract," in IEEE Access, vol. 8, pp. 103833-103847, 2020, doi: 10.1109/ACCESS.2020.2999410, 15 pages.
Srinivasan, S. Economic valuation and option-based payments for ecosystem services. Mitig Adapt Strateg Glob Change 20, 1055-1077 (2015). https://doi.org/10.1007/s11027-013-9516-5, 23 pages.
Coderoni, S., Longhitano, D., & Vinci, A. (2014). "Payment for Ecosystem Service for Carbon Credits From Italian Olive Groves. Some Issues Regarding the Mode of Payment.", International Journal of Food and Agricultural Economics, 2(4), 63-79, 18 pages.
ecosphere.plus.com, "Ecosphere+ helps bring carbon pricing to the point of sale" https://ECOSPHERE.plus/2018/05/27/ecosphere-helps-bring-carbon-pricing-point-sale, May 27, 2021, 9 pages.

(56) References Cited

OTHER PUBLICATIONS

Peters, Adele, "This-tech-offsets-the-carbon-footprint-of-each-item-you-buy", https://www.FASTCOMPANY.com/40576812/ May 24, 2018, retrieved Nov. 1, 2022, 6 pages.

* cited by examiner

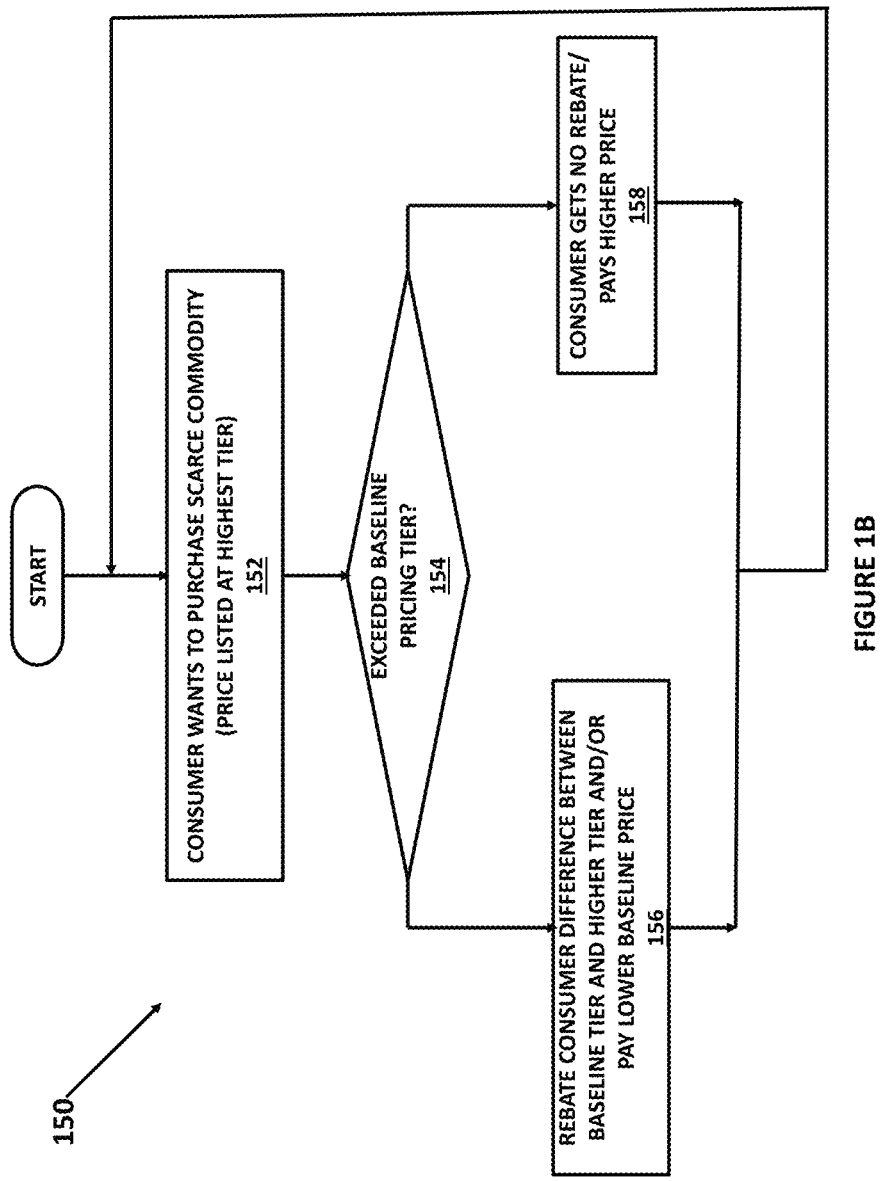

SYSTEM AND METHOD FOR TIERED PRICING FOR SCARCE COMMODITIES

RELATED APPLICATIONS

This application is a continuation in part of and claims priority under 35 USC 120 to U.S. patent application Ser. No. 17/109,588 filed Dec. 2, 2020 (published as US2021/0166314) that in turn claims the benefit under 35 USC 119(e) of U.S. Provisional Application No. 62/942,764, filed Dec. 3, 2019, and all of which are incorporated herein by reference.

FIELD

The disclosure relates generally to a system and method for a tiered pricing system and method for scarce commodities, such as petroleum products, water or food stuffs, that can be used to ration those scarce commodities. In one implementation for petroleum products, the system may also reduce atmospheric emissions and in particular to a system that individualizes the carbon emission reduction.

BACKGROUND

Scarcity of products, such as heating oil or wheat, in time of war or famine often leads to government-imposed rationing to allocate these scarce products to benefit all citizens. Without rationing of such supply-limited products, prices would surge. The wealthy would pay the higher prices for their food or fuel and the poor would starve or freeze. Rationing is typically implemented by the issuance of coupons that must be submitted to a vendor (merchant) at time of purchase.

Some egalitarian governments use rationing to establish a nutritional baseline for their citizens. For example, in Cuba, ration books are in use for beans, rice, and other food products. The quantities of each product is allocated to each citizen, rich or poor, based on age, gender, and health status. Vendors must reconcile their sales and the rationing coupons they received for those sales. This is a complex and inexact process that often leads to black-market sales. Shortages caused by war can require a rationing system to be implemented quickly. This haste in the implementation can lead to an unfair and easy to circumvent system.

Rationing scarce resources, as described above, can be extended to resources that many people believe should be forced into scarcity, such as products that produce greenhouse gasses (GHGs—"CO2" will be used interchangeable in this application to include all GHGs) in their production or use. Because the release of CO2 into the atmosphere has not historically been priced or constrained, its environmental cost, borne by all of humanity, has been externalized from purchase decisions and therefore continues largely unconstrained.

Existing in the utility marketplace are tiered pricing schemes for electricity and water in which the price of a resource increases as more of that resource is used by a particular user. Residential utility tiered pricing has been shown to be effective in reducing consumption by increasing unit price, in steps, as consumption increases. Tiered pricing has been applied by electric utility companies and by water utility companies. In each case, those companies enjoy an effective monopoly as the only option for a residential consumer. Because of this monopoly, these companies are typically regulated and their pricing is controlled.

To reduce overall electric consumption in a just manner, regulators and their subject utility maintain a low-price baseline tier that allows low income, and/or energy conservative, consumers to pay a low price for their electricity. This low price, if applied at all consumption levels, would lead to a very high overall consumption at a low marginal profit rate for the utility. The pricing tiers can be adjusted to reduce consumption and allow the utility to generate a reasonable return on investment to their stakeholders.

It is widely accepted in the scientific community that reducing world-wide Co2 emissions is necessary to slow the deleterious effects of climate change. The majority of Co2 emissions are a direct result of burning fossil fuels. Reducing fossil fuel consumption is necessary to significantly reduce Co2 emissions. If there were a single supplier of fossil fuels, a typical tiered pricing scheme could be used to reduce consumption in a way that rewards low-consumption users, discourages high consumption, and maintains the profit of the single supplier. However, in most countries, there are a multitude of competing oil companies from which a consumer can choose when making a purchase and those companies do not share individual sales transaction information with each other so that the typical tiered pricing system does not work nor achieve its goals.

It is desirable to provide a scarce commodity rationing system that addresses the above limitations and technical problems of existing systems and techniques that can be used for various scarce commodities including petroleum products, food items, water and the like and it is to this end that the disclosure is directed.

BRIEF DESCRIPTION OF THE DRAWINGS

FIG. 1B is a flowchart of a method for rationing a scarce commodity using the tiered pricing model;

DETAILED DESCRIPTION OF ONE OR MORE EMBODIMENTS

The disclosure is particularly applicable to a technology system that uses dual currency and tiered pricing to manage the rationing of a scarce commodity, such as a petroleum product, food stuff or water and to encourage the conservation of the scarce commodity. In one use case for petroleum products, the system may be used to ration petroleum products and reduce Co2 emissions and help a country, such as the United States, to achieve its nationally determined contribution (NDC) and to meet the C02 emission goals of the Paris Agreement. It will be appreciated, however, that the RACE system and method has greater utility since it can be used for any NDC or for all NDCs and it may be used to reduce emissions of other gases and the like. Furthermore, the rationing system and method can used to ration any scarce commodity including water, various food and food stuffs (wheat, rice, etc.), a service and the like.

If one company were to implement tiered pricing at their gas stations, linked to a loyalty card (or other method), that company would lose a customer as soon as that customer's consumption moved them into a pricing tier higher than the price of gas at a competing gas station. As a result, tiered pricing does not seem to be possible within a competitive industry. However, missing in the marketplace is a rationing system that can be implemented quickly, does not require coupons (printed or otherwise presented), is transparent, and is difficult to circumvent that overcomes and addresses the problems with typical tiered pricing systems or systems that try to encourage conservation of resources.

The scarce commodity rationing system may be used for gasoline, but also may be used for rationing any scarce commodity. For example, if rice were in short supply and every individual was given a rationed amount of 5 lbs/month, the "sticker price" of rice could be set to 3× the "baseline price" and an individual would be given an instant rebate of 2× the "baseline price," until their purchases exceeded the rationed amount and then the purchaser would pay a higher price. In one embodiment, the quantity purchased by the purchaser from any of the vendors that sell the commodity are summed into a predetermined quantity. Then, when another purchase is made, the desired purchased quantity and the predetermined quantity are summed together to determine the total quantity of the commodity and what price tier applies to the current purchase. In another embodiment, for a particular commodity, the predetermined quantity for past purchases is set to zero so that the tiered pricing is applied to individual purchases without regard to past purchases. Continuing the example above, in this embodiment, the rationed amount may be 1 lb of rice for each purchase and the system then does not need to try to track the purchases of the commodity over time.

Figure 1A:
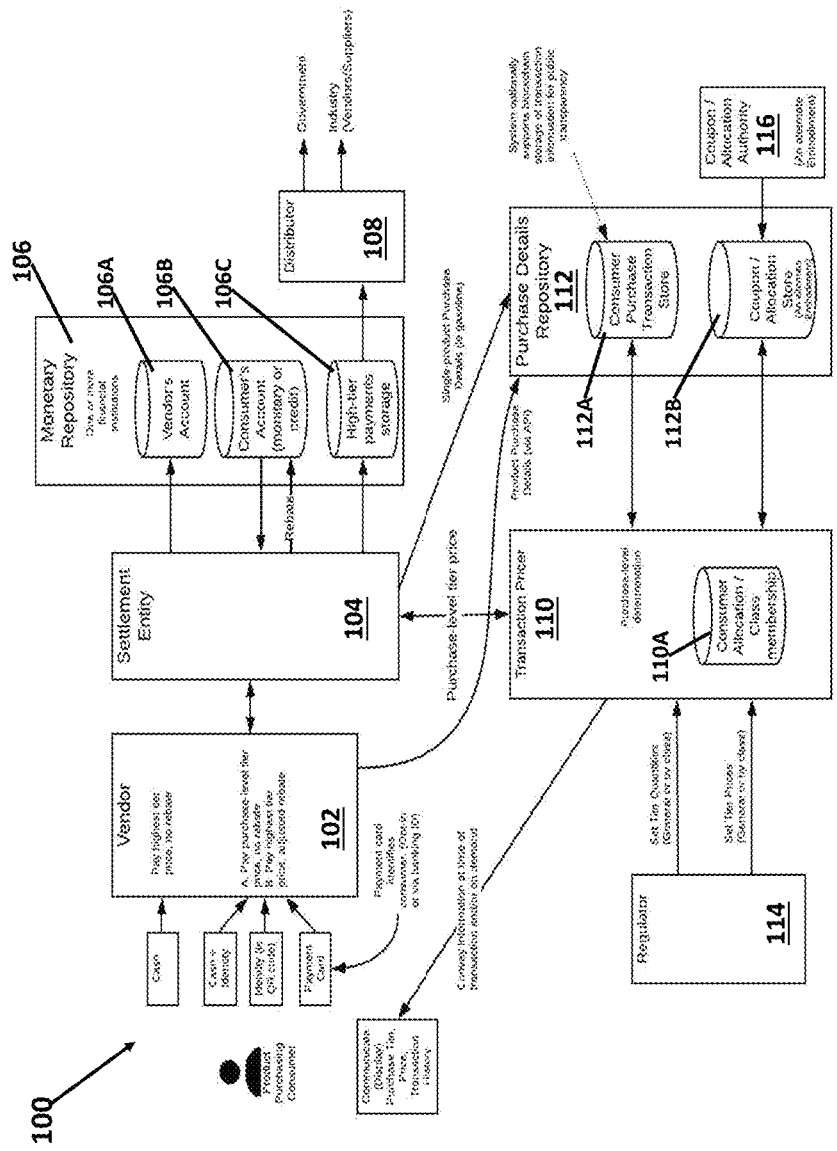
FIG. 1A is a diagram of an example embodiment of a system for rationing a scarce commodity that uses a tiered pricing model.

FIG. 1A is a diagram of an example embodiment of a system 100 for rationing a scarce commodity that uses a tiered pricing model. The system allows tiered pricing to be implemented across all companies (vendors) in an industry, or among industries and the system and method do not require cooperation among vendors. Tiered pricing, as implemented by the system, is a specific use case of the more generalized RACE conservation system and method that is discussed below with reference to FIGS. 2A-4B. The parameters of the RACE system in FIGS. 2A-4B including tier count, tier sizes, and tier prices can be adjusted to implement the rationing process and system shown in FIG. 1A. For purposes of illustration, the operation of the rationing system will be described with respect to the retail sale of gasoline by oil companies, but the concepts presented can be extended to other fossil fuel products and customers and thus can be extended to all products and services that emit Co2 (or GHGs in general) in their manufacture or use as discussed below and also can be extended to any products or services (the scarce commodity) that are sold by a single vendor or by a multitude of vendors. Furthermore, the system and method can be used to apply purchase-level tiered pricing to all scarce products (such as wheat, fuel, water, etc.) and/or services (e.g. transportation) purchased by a consumer.

The system 100 in FIG. 1A can be used for rationing, or allocation of, any product (wheat, fuel, water, etc.) and/or service (fuel-based transportation, airplane flights [by number or distance], etc.), including those that generate Co2/GHG emissions. The system 100 can ration/allocate, using tiered pricing, one or more components of products as well (wheat, sugar, steel, BTUs [or other measures of energy], etc.). For example, if cashews are subject to rationing/tiered pricing, then purchasing a kilogram of cashews and purchasing four kilograms of mixed nuts containing one kilogram of cashews would both result in measuring a kilogram of cashews being purchased by the individual. Co2/GHG emissions can be considered a component of products and services and thus the system 100 can apply tiered pricing to those emissions. The system 100 supports one or more pricing tiers with a single tier being a degenerate case and would be used for strict rationing. As another example, the scarce commodity may be beef (that is rationed) in which the beef is used in a plurality of different purchasable items such as hamburger, steaks, etc. and the user is assessed a quantity of the scarce commodity (beef) each time any of the purchasable items are purchased by the user.

In the commodity rationing implementation shown in FIG. 1A that might be used for commodity scarcity resulting from war, famine (or other causes), there would typically be two tiers of pricing. The first tier allocates most of the commodity (that may be a product, a service, individual components/parts of a product or sets of components of point-of-sale products) at a fiat price (lower or higher than a market-determined unrationed price) to all consumers (citizens). This allocation can be adjusted to each consumer based on the consumer's age, gender, health condition, etc. This baseline tier, in times of hardship, keeps people alive. A second tier is a higher-consumption tier that is priced higher (possibly many times higher) than the price of the baseline tier. The price at this higher tier can be adjusted to sell product (or components within the product) that are scarce, yet more abundant than the society's lifeline amount, at a price that helps the government (or vendors) recoup their "opportunity cost" losses caused by the gap between a rationing price and the hypothetical market-driven price. The price at this higher tier can also be set to quash the establishment of a black market since it effectively allows the government to take the profits that a black market would otherwise generate.

The rationing system and method using the tiered pricing does not impede competition by vendors. In the use case of applying tiered pricing to a component of a product, such as GHG/Co2 emissions, the overall product price can still be set by the vendor. Only the component(s) being regulated would be priced by regulators (including government, industry consortium, treaty, etc.).

The rationing system and method can be operated in two different implementations. In a first implementation, the system tracks individual consumer purchase history of each product (or components within each product) by integrating with payment methods, including credit cards, debit cards, phone-based payment methods, vendor sales systems (via APIs or other methods). Vendor sales system integration may be voluntary on the part of the vendor or may be required by law. The price listed by a vendor for a particular commodity, in the preferred embodiment, is the highest tier price for that commodity. As discussed in more detail below with reference to FIG. 1B, when the consumer who has not yet exceed their baseline purchase tier makes a purchase, they are rebated (almost instantly in the preferred embodiment) the difference between the baseline price and the listed price. When the consumer exceeds their baseline tier, or if they pay in cash, they receive no rebate. In this implementation, the system may determine the quantity purchased using integration with the payment card/device or payment processing network and the refund/rebate is credited back to the same payment card/device. In another embodiment, the system and method determines the quantity purchased through integration with the vendor's checkout system (locally or at a centralized/regional data center). Sale quantity integration can be through back-end APIs, Bluetooth (or other) close-range communication between the point-of-sale system and the customer's mobile phone (or other device or payment card). The system thus tracks cumulative purchase quantity for each customer across all vendors for each commodity and uses the purchase level to determine which tier in which a sale is taking place and the price (and therefore refund/rebate) is appropriate for that sale. In the preferred embodiment, a consumer opts-in to associate any (or all) of their payment methods to the system so they can easily enjoy the benefits of automatic instant rebates when they make purchases in the baseline (lower) tier.

In an alternate embodiment, the system instead of tracking cumulative purchase quantity for each customer, may receive electronic coupons/vouchers/allocation-units (coupons) from a granting authority (explicitly through APIs or generated by rule-based methods). These coupons can be stored in an account linked to the customer and decremented (used) as the customer makes purchases. Alternatively, the coupons can be stored by the customer on their mobile phone (or other device) and used at time of purchase. At point of purchase, the customer presents the coupon using their mobile phone for receipt by the vendor/merchant. For example, at time of purchase, the customer presents a QR code displayed by their phone to the vendor that identifies the coupon or customer's coupons repository (account or stored locally on the phone) or the customer (link to the customer's coupon/allocation account). The vendor scans the QR code (or other data exchange, such as near-field communication). In this embodiment, the point-of-sale system will be informed (by the system) of the price to charge the customer and no rebate/refund is necessary. This embodiment supports cash payments. Alternately, instead of presenting an identifying QR code, the use of a payment card/device/identification card/identification token (physical or electronic) can be used to identify the customer so the system can inform the point-of-sale system of the price of the transaction.

The rationing system and method supports any number of quantity/price tiers from a single tier (fixed-price strict rationing) to a multitude of tiers. Furthermore, each different commodity may have a different tier structure and price level. Tier sizes (quantities of each commodity at each price tier) can be set for the entire marketplace or by geographic region and/or be applied to all customers or be customized to individuals or classes of consumers. As the tier size becomes small (limited by the smallest quantity of product measure), the notion of tiers changes to a notion of non-linear pricing. For example, the first unit costs X dollars, the next unit costs 1.01x, the following 1.02x, etc.

Returning to FIG. 1A, the system 100 may include one or more vendors systems 102 through which a consumer may purchase a rationed commodity at the different price tiers as discussed below with reference to FIG. 1B. Each vendor system 102 may be a computer system that has a processor, memory and a plurality of instructions so that the computer system and processor can accept and process a commodity purchase request from the consumer. For example, the computer system may include a point of sale system. Each vendor system 102 may accept various forms of payment including cash, cash with an identity, an identity using a QR code and/or a payment card. The system may be integrated with the vendor system (or communicate with the vendor system) so that the consumer, for each commodity purchase may be provided with a user interface (from a transaction pricer system 110) showing the purchase tier for the commodity, the price for the commodity and/or the transaction history for the commodity. Each consumer that interacts with the system 100 may use a computing device that has a display that is capable of displaying the user interface. For example, the computing device may be a smartphone device, a laptop, a tablet computer, a personal computer and the like with a processor and memory and instructions that are executed by the processor to interface and exchange data with the vendor system, perform payment operations and display the user interface.

The system may also have a settlement system 104 that is coupled to each vendor system 102 and communicates with each vendor system 102. Thus, if the consumer proceeds with the purchase by using a payment card or device, the consumer's monetary account is debited automatically by the settlement system 104 (this may be a card processor, financial institution, or the system in conjunction with one of those entities). The vendor's monetary account is credited with the funds debited from the consumer's monetary account (following existing, established processes). The debited amount is determined by the system and may include none, part of, or all of the difference between the lowest purchase-level tier and the consumer's current purchase-level tier. In the rationing case, the vendor would receive the lowest tier price and if the consumer is in a higher (the higher) tier of purchase-level, the difference in payment would be transferred to a High-tier Payment Account for use and distribution by the regulating government entity. The settlement system 104 may receive purchase level tier price information (for each commodity) from the transaction pricer system 110.

The settlement system 104 may be connected to a monetary repository system 106 (that may be one or more financial institutions) that store vendor accounts 106A into which proceeds from a purchase are credited, consumer accounts (monetary or credit) 106B from which a purchase is debited and any rebate is credited and a high tier payments 106C for use and distribution by the regulating government entity 108. The settlement system 104 may also send single commodity purchase details, such as for gasoline, to a purchase details repository 112.

The purchase details repository 112 may also receive product purchase details for a purchase, such as via an API, from the vendor system 102 for each transaction. The purchase details repository 112 may have a consumer purchase transaction store 112A and a coupon/allocation store 112B that is used for the alternative embodiment that uses coupons. The coupon/allocation store 112B receive the coupons/allocations from a coupon/allocation authority 116. The consumer purchase transaction store 112A may store each purchase transaction and may support blockchain storage of the transactions for public transparency. In the use case of rationing due to war, the distributed nature of blockchain storage minimizes the disruption of the system should a data center, or set of data centers, be destroyed or disconnected from the Internet. The data stored in each of the stores may be exchanged with the transaction pricer system 110 as shown in FIG. 1A. For example, the transaction pricer system 110 may send a purchase level determination to the consumer purchase transaction store 112A.

The transaction pricer system 110 may determine (for example using the method in FIG. 1B described below) the purchase level tier price for each purchase transaction. The transaction pricing system 110 may have a consumer allocation/class membership store 110A that stores the different classes of consumers that may have different price tiers and quantities allocated by the system. In one embodiment, a regulator system 114 may be connected to the transaction pricer system 110 to set tier quantities (generally or by class)

and set tier prices (generally or by class). For example, the regulator can set tier sizes and prices uniformly for all consumers or can set them differently for different classes (or other demographic or membership attributes) of consumers. Classes may be created based on age, gender, employment type, health status, region of residence, or other attributes. The regulator 114 may also set, in some embodiments, when/if the tier quantities or prices are reset for each consumer. For example, if each consumer has an allocation for a particular commodity over a year period, the system may then reset the tier quantities or prices at the end of the year so that the consumer, when making a purchase after the reset, is making the purchase at the lower price tier until the quantity for that lower price tier is exceeded during the next ration period (1 year in this example.)

In one embodiment, a consumer may be automatically enrolled into the system requiring no initial opt-in or configuration by the consumer. Each consumer has a single purchase transaction store for all of the purchases for all of the different scarce commodities. Payment card (including mobile payment devices) serves to pay for the transaction and to identify the consumer. In some use cases, the consumer must opt-in to include one or more of their payment cards for use by the system. If the identity of the consumer cannot be determined by the system, the purchase transaction payment method is treated, for tiered pricing calculations, as if it were a cash payment. The use of the word cash should be interpreted to include other non payment card payment methods, such as crypto currency. If a crypto currency is used that conveys personal identity, it may also be used as a method of identifying the customer by the system.

At the time of sale, if the customer is identified from their payment card or device, the system, in one embodiment, may display (on customer's mobile phone/device and/or on point-of-sale device) the consumer's pricing tier and the price of the product within that tier as shown in FIG. 1A. If the customer chooses to pay with cash, the system displays the price for the highest priced tier. In one embodiment, the vendor displays the prices for the product at each purchase-level tier and the consumer would typically know their consumption history and the price they will likely have to pay to purchase the product. In the preferred embodiment, the consumer can access the system using their mobile device (or other method, such as a vendor display, after presenting identification to access the consumer's purchase level) to be shown the price they will pay for their anticipated purchase. Single product purchases, such as gasoline from a gas pump, do not require the system to integrate with vendor equipment to determine quantity purchased. Purchases that include a basket of products, only one or more of which are subject to tiered pricing (rationing) require vendor integration to transfer transaction details to the system.

In some embodiments, to eliminate the need to collect the revenue difference between high-tier and low-tier revenue, cash payments may be disallowed. Alternately, a tracking identifier (Using a phone, printed card, or other consumer identifying method) may be required to be presented to the vendor when making cash purchases. This is especially applicable to the use case of commodity rationing. In one embodiment, companies directly receive the higher prices paid by consumer purchase above the baseline tiers. The tiers and prices are adjusted by regulators to reduce consumption and simultaneously maintain industry profit levels or dividend disbursements.

In the dynamic pricing case, where the above-baseline purchase-level price is set by a consumer exchange, a transaction load can be set by regulators. Revenue from the exchange transaction load can be distributed to each company to replace the reduced marginal contribution to profit as consumption falls. This distribution could be calculated using parameters from each company's GAAP reporting. Dynamic pricing allows consumers to sell their unused lowest purchase-level allocation on an exchange, further motivating them to reduce consumption. This dynamic pricing embodiment can be used to establish the scarce resource (such as Co2/GHG emissions) as a fungible currency that can be used across a multitude of industries whose products cause the release of Co2/GHG into the atmosphere.

FIG. 1B is a flowchart of a method 150 for rationing a scarce commodity using the tiered pricing model that may be performed by the transaction pricer system 110 in FIG. 1A, for example. The tiered pricing model may be implemented using the system in FIG. 1A, but can be implemented in other manners that are capable of implementing the processes shown in FIG. 1B. For purposes of illustration, FIG. 1B shows the method 150 for one particular scarce commodity that has a particular tiered pricing model, but it is understood that a similar method may be used for each different scarce commodity in which the tier levels, the price at the different tiers, etc. may be different. For purposes of illustration in this example, the scarce commodity is water in which there are two tiers (0-1000 gallons is a first tier at $10 per gallon and 1001+ gallons is a higher price tier at $100 per gallon and the pricing tiers reset each month so that each consumer can use up to 1000 gallons each month and pay the lower tier price).

The consumer may desire to make a purchase of a scarce commodity (152). The scarce commodity may be a good or a service. Under the tiered pricing model discussed above, the scarce commodity is priced at the highest price tier (which is used for a consumer who has exceeded their baseline purchase tier allocation for the particular scarce commodity.) The method may then determine if the baseline pricing tier for the particular consumer for the particular scarce commodity has been exceeded (154). Thus, in the water example, if the particular consumer has already purchased less than 1000 gallons in a month, the particular consumer is entitled to pay the lower tier price (156) and either pays that lower tier price or gets rebate between the higher tier price and the lower tier price for each gallon of water purchased. If the particular consumer had already purchase more than 1001 gallons, the consumer must pay the higher tier price and does not get a rebate for the purchase (158). Note that if the particular purchase staddles the two pricing tiers (the particular consumer makes a purchase of 990-1010 gallons this month) during a single purchase, the consumer pays the lower price for gallons 990-1000 and then the higher price for gallons 1001-1010.

Once the purchase for the particular quantity of the particular scarce commodity is completed, the method loops back to process 152 for the next time the particular consumer wants to purchase the particular scarce commodity. When the cumulative total for a particular scarce commodity for a particular consumer is reset, it affects the decision process 154 in which it is determined if the baseline pricing tier is exceeded. As discussed below, the same based method could be used wherein the scarce commodity is C02 emissions and the goal is to make it more expensive for the consumer to create more C02 emissions into the atmosphere.

CO2 Emission Pricing Embodiment

The rationing system and method that uses tiered pricing can be used for pricing Co2 emissions (RACE). If the higher-tiered revenue is retained by vendors, the system and method can allow oil companies (in general, companies within an industry or among industries) to be compensated for producing less (or emitting less Co2 into the atmosphere). By replacing profit lost as a result of reduced consumption, the system aligns the profit interests of the oil industry with the overall societal interest in reducing Co2 emissions to slow climate change. In this embodiment, the tired prices are based on Co2 emissions. This system can be implemented as a step toward meeting Paris Agreement Co2 emission goals. The system aligns individual purchase decisions and the fossil fuel industry with what is best for society as a whole, to slow climate change.

The RACE system and method rewards people for making choices that reduce Co2 emitted into the atmosphere. The system accomplishes this without imposing any taxes and the system is analytical, science-based, and resistant to political manipulation by parties motivated to maintain the fossil fuel consumption status-quo. The RACE system and method is market-driven and rewards citizens for considering Co2 emissions when making purchase decisions. The RACE system and method denominates Co2 emissions with a new currency, called the Carbon, that represents 1 Kg of Co2 emitted into the atmosphere. In the RACE system and method, products and services are priced with both a monetary value (dollars in the USA example) and Carbons. The Carbons are the cost to manufacture/use the product or service being purchased in terms of Kgs of Co2 emissions. In a preferred embodiment, unlike the monetary price, the Carbon price is not marked up.

In the RACE system and method, the government each year issues each citizen's, or resident's, allocation of the Paris Agreement target Co2 emissions, denominated in Carbons. Those Carbons are placed into a single account, held by a financial institution and linked to the individual. In the USA, the linkage may be accomplished using a social security number of the individual, but can be accomplished in a number of different ways that are within the scope of the disclosure. Each citizen receives the same allocation of carbons—an equal right to pollute and thus each user can choose how to spend his/her allocation of carbons since all products and services in the RACE system have a monetary price and a Carbon price and, much like nutritional labeling, the Carbon price must be visible to the citizen who is making a decision to purchase (referred to as a "Purchaser").

Changing human behavior is difficult, but the RACE system and method makes it very simple and gradual with the Carbons. On the first day after implementation, no change of consumer behavior is needed and each purchaser can continue to make their purchase decisions except that each purchase decision has a Carbons consequence. A period of time after implementation, a purchaser who causes more than the average emission of Co2 will start to see that he/she is having to pay for the extra Carbons (a surcharge) and that surcharge may cause the purchaser's purchase decision to change. Everyone can learn at their own pace, but the motivation to learn and to conserve Carbons is individual financial gain since a person can sell the Carbons that they don't use during the year and reap the financial rewards.

The RACE system and method then settles the dual current (monetary and Carbon) transactions for purchases of the products and services. When paying with a credit or debit card or other electronic payment, the settlement process works as it does today with dollars (for a US transaction) being debited, and it also automatically debits Carbons from the purchaser's Carbon account.

If the purchaser's Carbon account runs out, they can still pump the gas, buy the steak, or ride the bus, but the purchaser will have to also buy the Carbons. The purchase of the Carbons may be done on Carbon Exchange and the purchaser pays for them with dollars at the current market price. The RACE system and method handles the purchase of Carbons automatically and the surcharge to the purchaser appears on the sales receipt. People are free to sell their Carbons on the Carbon Exchange and anyone who uses less than their allocation will be compensated for their unused Carbons with dollars. It can be thought of as a rebate and the RACE system and method rewards Carbon conservation.

Figure 3:
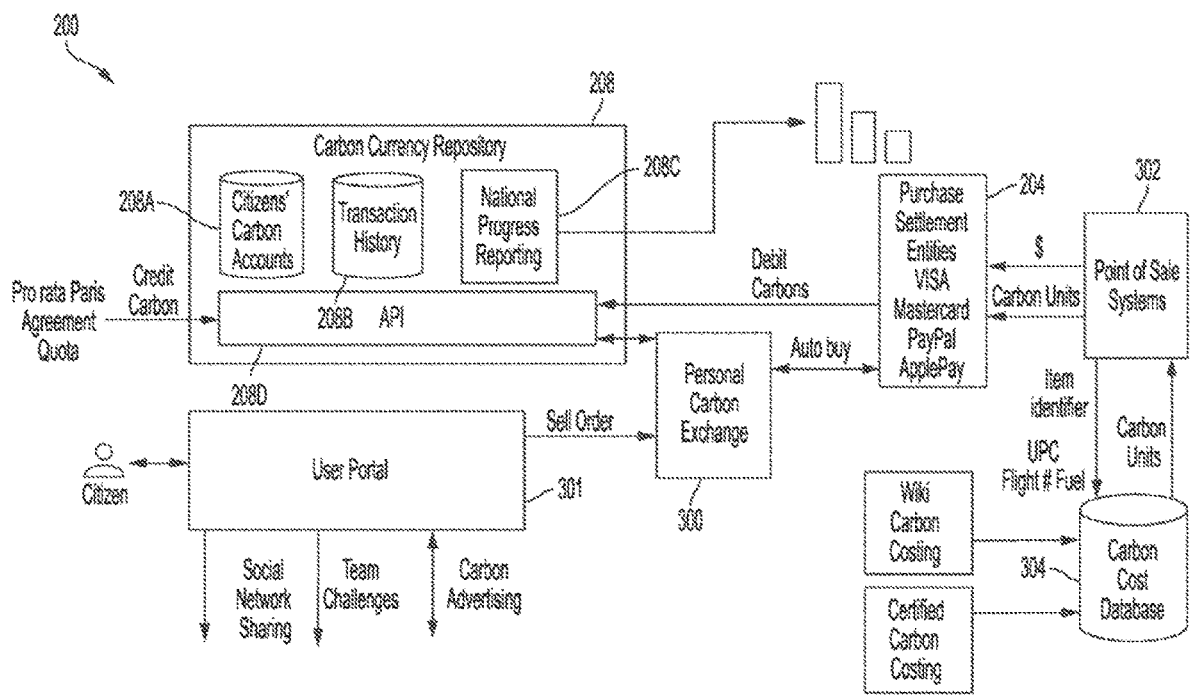
FIG. 3 is a diagram of another example embodiment of the reduce all carbon emissions (RACE) system.

In the RACE system, cash payment for products or services require the immediate purchase of Carbons on the exchange. This is handled by the RACE integration at Point of Sale as shown in FIG. 3 and discussed below. The purchase price of the necessary Carbons will appear on the receipt.

In the RACE system and method, high carbon footprint individuals will pay a premium for above-average consumption by purchasing Carbons from citizens who are more Carbon conservative. This is analogous to tiered pricing used by companies supplying electricity to consumer's homes—baseline consumption is priced low and as consumption increases, the unit cost increases.

Corporate and government entities do not receive an allocation of Carbons and they can use as much as they want. However, they must allocate the Carbons they spend into the products and services they provide. Their accounting firm must balance the Carbon books and assure they are net zero at the end of each year.

The RACE system and method can work in any country and it can be used to meet Paris Agreement commitments. Ultimately, there is a global Carbon exchange. This is a world-wide problem and the Paris Agreement appears to be our best hope for international cooperation.

The RACE method, unlike across-the-board taxation or industry-wide cap-and-trade for meeting the emission goals, gives decision making power to the consumer. This key point drives technological innovation to reduce Co2 emissions. RACE is a market-driven system that drives innovation to reduce Co2 emissions while maintaining our lifestyle. This is not a zero-sum game. Most of the advances we have made as humans have been demand driven with monetary cost reduction as the leading driver. However, up until now, the hidden cost of CO2 emission has not been accounted for.

Individual motivation to reduce Carbon spend for financial gain will drive that innovation. When a consumer selects a flight from city A to city B, they will shop for monetary price and for Carbon price. Airlines will find ways to reduce Carbon price. Manufacturers will innovate to reduce Carbon price. Farmers will do the same. So will any entity that wants to maximize their revenue.

To meet climate change goals, worldwide Co2 emissions must be reduced. In each industrialized country, each citizen's rightful share must be reduced every year. It is only through market-driven innovation that we can maintain our lifestyle while living within a shrinking Carbon budget. RACE aligns individual purchase decisions with what is best for society as a whole, to slow climate change.

Figure 2A:
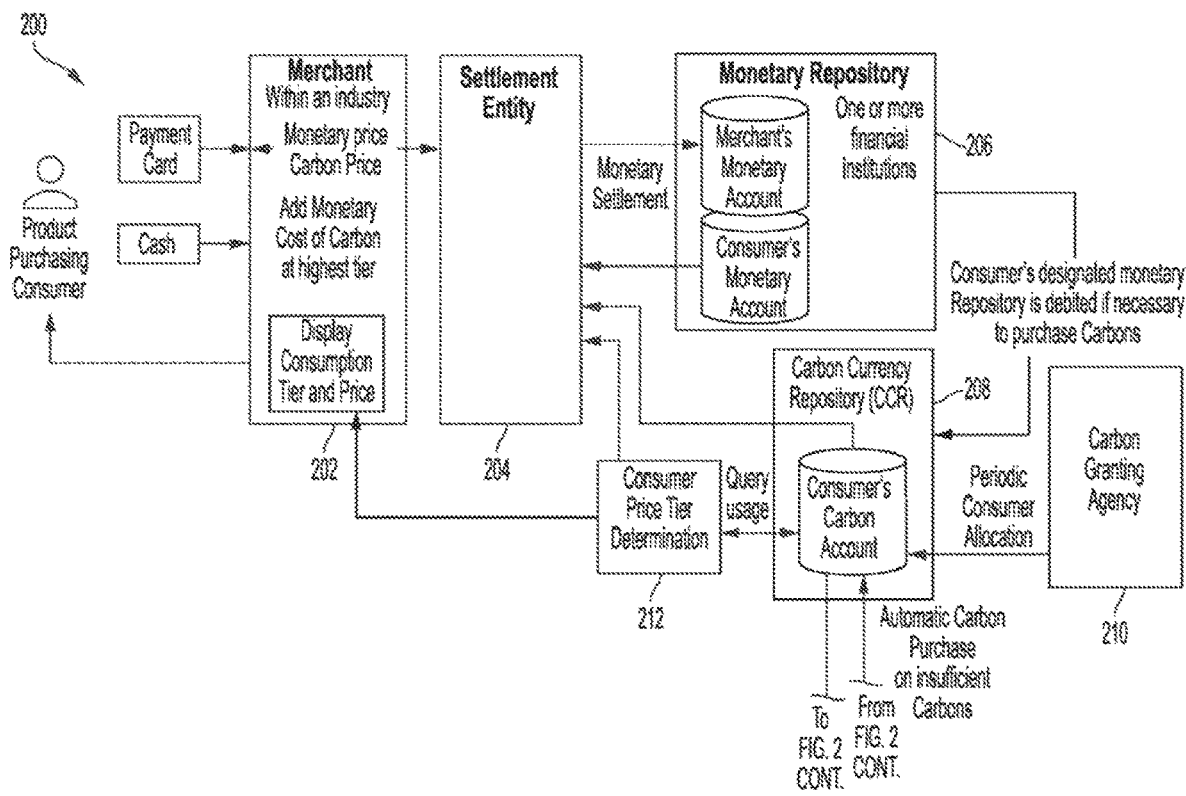
FIGS. 2A and 2B are a diagram of another example embodiment of the system being used to reduce all carbon emissions (RACE)
Figure 2B:
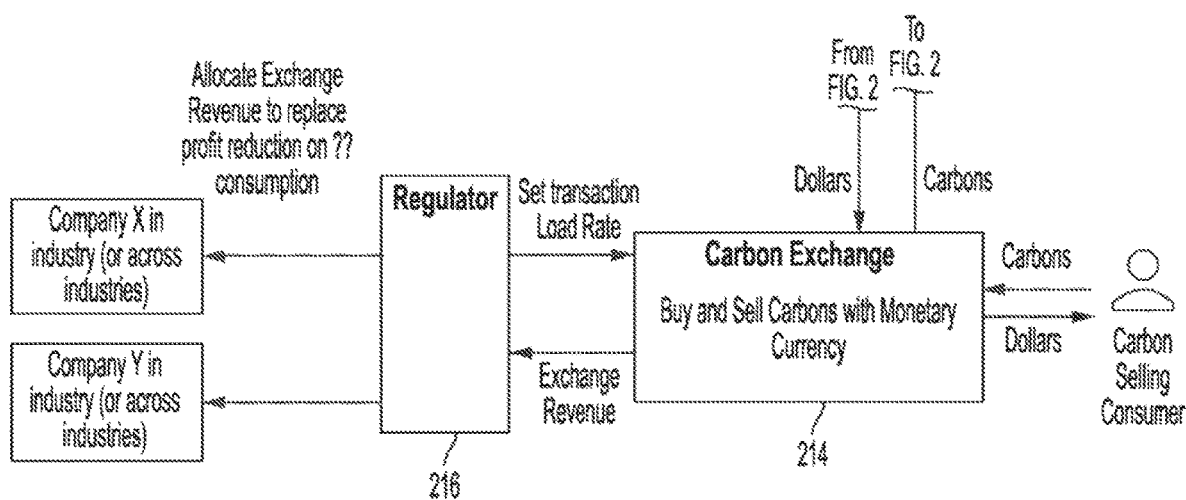

FIGS. 2A and 2B are a diagram of an example embodiment of the reduce all carbon emissions (RACE) system 200. The system 200 settles sales/purchase transactions for products or services that are dual priced with both a monetary currency price and an allocated/rationed Carbon currency price. The carbon currency price (known as a Carbon) has a value, for each product or service, that corresponds to an amount of carbon dioxide emitted to make, use and sell the purchased product or service. The Carbon may be measured in kilograms and each full unit of Carbon (1 Carbon unit) may correspond to 1 kg. of Co2 emission. The system 200 may be implemented using a plurality of computing resources, such as processors, memory, servers, database, blade server, cloud computing resources and the like that are known, but the processes and methodologies performed by the system 200 are not conventional, well known or routine in the greenhouse gas reduction industry. In one embodiment, the functions and processes of the system 200 are partially implemented using a plurality of lines of instructions/computer code that are executed by one or more processor(s) of the computing resource of the system 200 and configure the processor(s) to perform the not well understood, not routine and unconventional processes of the system 200. Furthermore, each of the elements of system 200 may be implemented as one or more computer systems with at least one processors for executing a plurality of lines of instructions.

The system 200 may be used by a purchasable item (product or service) consumer who can use a payment card or other form of electronic charge or cash to pay a merchant 202 for the purchasable item. As discussed above, each purchasable item in the system 200 may include a monetary price and a Carbon price. For the payment card transaction, the system 200 can access a carbon account of the purchaser in a carbon currency repository 208 and thus both of those prices are communicated to a settlement entity 204. For a cash transaction (since the identity of the purchaser and his current Carbon allocation may be unknown), the system 200 communicates the monetary price of the purchasable item and a monetary cost of the carbons needed to cover the Carbon price of the purchasable item at a highest tier to the settlement entity 204. Upon completion of the purchase of the purchasable item, the merchant 202 may generate a user interface for the purchaser that displays a consumption tier for the purchaser for the Carbons and the monetary price of the Carbons when the Carbon account of the purchaser has insufficient Carbons to complete the purchase of the purchasable item.

For the monetary portion of the purchase of the purchasable item, the monetary price may be communicated to a monetary repository 206 that may be one or more financial institutions (banks, credit card companies, credit unions, etc. that each have a plurality of known computer based financial transaction processing systems). The financial institutions may store at least a merchant monetary account and a consumer monetary account. For a purchase of a purchasable item, the monetary price may be deposited into the merchant monetary account and withdrawn from the consumer monetary account (shown as a monetary settlement in FIG. 1). In addition, the consumer monetary account in the monetary repository 206 may be debited if necessary, to purchase some of all of the Carbons associated with the purchase.

In the system and method, the Carbon account of each individual may be associated automatically to a person's credit card (or any/all of the cards or electronic accounts), with the social security number being the common "link" in the United States. Thus, for example, when a buyer buys gasoline with an electronic payment card or account (e.g. VISA, Mastercard, ApplePay, Paypal, AmazonPay, gas company credit card, etc), the purchaser's personal Carbon account is associated to that electronic purchase account wherein the association can be automatic (common linkage of a 3rd party credit reporting agency such as TRW, Equifax, etc) or manually via the buyer's manual association of that card to his social security Carbon account. Alternatively, the association may be by "credit card" that could be swiped via a magnetic strip, RFID, credit card chip sensor, mobile phone or watch wearable, and also means a debit card, credit card, ATM account, or any other financially-linked payment mechanism. In one embodiment, a mathematical hash algorithm can be utilized to one-way reference an associated financial account number to an individual's Carbon account. The association in the system automates the linkage of a purchaser's various financial accounts to that same purchaser's Carbon account that facilitates the two currency settlement method and ensure that the Carbon price for the purchasable item is charged to the purchaser. The association between the Carbon account and all the monetary accounts of the purchaser also means that the system and method updates the Carbon account of the purchaser is real-time when the purchase transaction occurs in contrast to the known frequent flyer programs in which the update of the frequent flyer program account is not real-time and can take a long time to be updated.

If the above association between the card of the purchaser used for the monetary purchase of the purchasable item and the Carbon account of the purchaser is not present for whatever reason, then the cash payment model described above may be used. In particular, a purchaser using an unlinked card for the purchase of a purchasable item must buy the necessary Carbons for the purchase of the purchasable item and incur the monetary cost of the Carbons purchase since no association with the Carbon account of the purchaser exists. Thus, the system and method, regardless of the association of the account and the carbon account of the purchaser, uses a single event (paying using a card associated with the account of the purchaser) that causes two separate account updates: 1) a financial update (such as posting the dollar charge to my VISA account related to that card for example) to charge the purchaser for the monetary cost of the purchasable item; and 2) posting the Carbons associated with this purchase to my Carbon account (automatically) to charge the Carbon cost to the purchaser for the purchasable item or the purchase of the Carbons if the association between the account/card and Carbon account does not exist.

A consumer price tier determination module 212 (that may be a computer system having a processor that executes a plurality of lines of computer code/instructions to implement a price tier determination process described below) is connected to the settlement entity 204 and may receive requests to determine the price tier for a particular purchase by a particular consumer and generate the consumption tier and price data that is displayed to the consumer as described above.

The system 200 may also have a carbon currency repository (CCR) 208 that is coupled to the monetary repository 206, the consumer price tier determiner 212, a carbon granting agency 210 and a carbon exchange 214. The CCR 208 performs the carbon purchase/sales/exchange processes that are part of the system 200. For example, when a user has to purchase carbons (if the particular consumer does not have sufficient Carbons for the purchase and/or is purchasing the purchasable item by cash) that process is performed by the CCR 208. The CCR 208 may also provide data to the consumer price tier determiner 212 about the usage of carbons for a particular consumer who may have a consumer carbon account (like a monetary account except that the account has a predetermined of carbon credits of the consumer) stored in the CCR 208. Thus, the CCR 208 may have a plurality of carbon accounts for a plurality of different consumers. The carbon granting agency 210 may be an agency (government or otherwise) that periodically grants a predetermined number of carbons to each consumer that are then stored in the consumer carbon account.

The carbon exchange 214 may participate in the automatic carbon purchase for a purchase of a consumer when the consumer has insufficient carbons for a purchase which ensures that a lack of sufficient Carbons does not prevent a purchase for being consummated. Thus, as shown in FIGS. 2A and 2B, a monetary value will go to the carbon exchange 214 and Carbons will be purchased and sent to the CCR 208. The carbon exchange 214 may perform the buying and selling of Carbons with monetary currency. For example, a particular consumer who has extra Carbons during the allocation period of time may sell his/her Carbons to another consumer on the Carbon Exchange 214 and receive a monetary compensation.

The carbon exchange 214 may be connected to a regulator 216 who may set a transaction load rate that is a monetary percentage of each transaction of the Carbon Exchange 214 and get exchange revenue. An example load rate is 15% and the load rate may used to replace/offset lost profits from legacy energy providers (e.g., oil companies in the fossil fuel example), research and development costs, exchange fees, administrative fees, accounting fees, etc. The regulator 216 may allocate the exchange revenue to replace profit reduction due to reduce consumption of Carbon emitting operations, such as burning fuel, to one or more different companies or industries.

The preferred embodiment of the system 200 is operated with a goal of reducing atmospheric $Co_2$ emissions by aligning individual consumer motives with the global motive of slowing climate change. Under this system 200, market-driven technological innovation as shown in FIGS. 2A and 2B will consider $Co_2$ emissions (the Carbon price) as a cost in a purchasable item (product or services) development, marketing, sales and use to meet the demand of a population that considers the $Co_2$ emissions cost when making purchase decisions. The system, by virtue of automatically linking the settlement of both the monetary price and the Carbon price during a transaction will require no immediate change of consumer behavior, but consumers can voluntarily choose to select low Carbon purchasable items. Market-driven systems that distribute limited resources require transparency so the participants can align their best interests with the goals of the system. A vital component of the system is accurate Carbon pricing for all products. In the system, all Carbon costs (production and/or usage) for each purchasable item are shown to consumers on a label, sign, or conveyed with another method that makes weighing Carbon costs part of the consumer's purchase decision process.

For illustration purposes, five broad categories of products will be described. Services, especially services with product components, must also be considered. The system is not limited to processing transactions in these categories. In the preferred embodiment, the purchasable items in all of these categories are dual priced, having a dollar price set by the merchant and a Carbon price set by a process that can include scientific review board, manufacturer determination (subject to auditing), accounting firm, or a combination of these and other methods.

The example categories of products may include: A—Non-energy consuming products, such as books of dinnerware for example that do not consume energy or release $Co_2$ when being used, B—Agricultural goods, such as food for example, C—Energy consuming products, such as a heater or a stove for example that emit $CO_2$ when in use, D—Energy (Fuel and electricity) and E—Transportation Services, such as cars, taxis and airplanes. Products in categories A, B, and C have a "Production Carbon cost." This reflects $Co_2$ already released during the creation of the product. Products in category C also have a "Usage Carbon cost" that reflect Carbon efficiency that is a measure of $Co_2$ release during operation of the energy consuming product. Products in D and E have a "Usage Carbon cost" that reflect the $Co_2$ that will be released when the products in these categories are used. Products in D (Energy) also have a Production Carbon cost that, for simplicity, can be included in the "Usage Carbon cost."

Using the system 200 shown in FIGS. 2A and 2B, the system tracks Carbons for every sales transaction made by consumers, including those made by individuals, corporations, and government entities. The Carbon accounts held by corporations and government entities can be debited without limit and these accounts serve to audit these entities' Carbon consumption. A corporation uses their Carbon account for product pricing calculations. Corporations must allocate their Carbon spending to their products. Government entities must either raise Carbons through taxation denominated in Carbons (using flat or progressive taxation), or by buying Carbons with dollars raised through monetary taxation. Government entities must acquire the Carbons necessary for all of their missions. The Federal government has a third option, it can set aside the Carbons for its budget from the national allocation before distributing the remainder to its citizenry. At the end of every accounting period (calendar or fiscal year, for example), all Carbon spending (individual, corporation and government) must match the national allocation.

For consumers who have used more than their Carbon allocation, they have automatically used the Carbon exchange 214 beginning when they surpassed their allocation to purchase the needed Carbons. For consumers who have used less than their Carbon allocation during the period, they could have (at any time) sold Carbons on the exchange. At the end of the accounting period, their excess Carbons are automatically sold on the exchange and they will receive the end-of-year monetary value.

For government entities that have spent more Carbons than they have raised through Carbon taxation or through Carbon exchange purchases, they must go to the Carbon Exchange 214 to close the shortfall and buy the Carbons that they need. Conversely, they must sell any excess Carbons at the end of the period.

For corporations, the reckoning of Carbons consumed and their allocation to products sold is audited by an accounting firm. This audit is completed in advance of the close of the Carbon accounting period. Shortfalls in Carbons or excess Carbons must be reconciled by purchases or sales on the Carbon Exchange 214 before the end of the Carbon accounting period. This process is followed by corporations at all stages of the value/production chain. In the preferred embodiment, the system can analyze the history of corporate Carbon spending, allocation to corporate products, and end-of-year variances. The result of this analysis can be one of the factors used to determine product carbon pricing.

In the example in FIGS. 2A and 2B, it is presumed that the consumer is a citizen of the country/region/area in which the system 200 is being operated. However, the system 200 may be used to a consumer that is not a citizen of the region/ country/area who is known as a non-citizen individual. The non-citizen individual must pay the cash price surcharge (e.g., the monetary price of the purchasable items and the monetary price of the Carbon price of the purchasable item) regardless of payment mechanism, unless their country is using the system 200. If the country of the non-citizen individual also uses the system 200, the Carbons charged to the non-citizen individual for the purchase will be debited from their national account.

The system 200 can be operated world-wide or regionally. In the preferred embodiment, each nation operates a Carbon Exchange 214 that serves to assist that nation in meeting its Co2 emissions allocation. The system 200 allows for the international exchange of Carbons among consumers (citizens, government entities, and corporations) of participating nations. The international Carbon Exchange allows wealthy, more-developed, nations to purchase Carbons from less-developed nations and serves as an incentive for all participants to meet agreed upon Co2 emissions goals. This is consistent with the goals of the Paris Climate Agreement. In one embodiment, the system 200 may be rolled out world-wide by having a nation in a leadership position to require trading partners to implement dual pricing and to participate on the International Carbon Exchange.

In an alternate embodiment, the allocated-currency cost assigned to an item are estimations of the deleterious environmental effects associated with the production or use of that item. This is a generalization of carbon-cost and can include factors such as the altitude at which the Co2 is released, the release or consumption of other chemicals, depletion cost, impact of releasing pollutants (in production or anticipated consumption) in a valley, urban center, or other location where the environmental costs (and concomitant human health costs) are elevated.

In an alternate embodiment, block-chain technology is employed to support standardized transparency, auditing, and security of the allocated-currency. The system uses block-chain technology to implement or track any or all of the storage functions within the system, including allocation, journaling of sales transactions, and journaling of exchange transactions.

Using the dual currency purchasing, the Carbon account, the Carbon Exchange and the other elements of the system in FIGS. 2A and 2B (which are all technical solutions and technology), the system solves the technical problem of reducing greenhouse gas emissions by using the technology to tie the reduction of the emissions to the purchasing decisions of each individual. The system and method provide an improvement in a technical field wherein the improvement include the dual currency purchasing, the Carbon account, the Carbon Exchange and the other elements of the system in FIGS. 2A and 2B). Furthermore, the aspects of the system in FIGS. 2A and 2B are not generic computer elements nor known systems and thus are not conventional, well known or routine in any industry. Furthermore, the system and method include novel processes and elements (dual currency settlement, Carbon Exchange, etc.) that meaningfully limit the claims. For example, the system is not merely a financial process since it has novel aspects, such as the dual currency settlement, the Carbons account and Carbon exchange, that are a technology improvement.

FIG. 3 is a diagram of another example embodiment of the reduce all carbon emissions (RACE) system 200 with more details. The CCR 208 is shown and further includes a citizen carbon account 208A for each consumer discussed above, a transaction history store 208B that stores data about each Carbon transaction and a national progress reporting element 208C that shows the Carbon reduction progress. The databases 208A, 208B may be implemented as hardware or software databases or using a blockchain system. The CCR 208 may also have an API 208D that facilitates the Carbon transactions including receiving credit carbons, receiving debit carbons and interacting with a personal carbon exchange 300 that may be part of the Carbon Exchange 214 in FIG. 1 or separate. The system 200 may also have a user portal 301 that allows each citizen consumer to interact with the system 200 including sell orders for carbons to the personal carbon exchange 300. The purchase settlement entities 204 may participate in debit carbon transactions and carbon auto-buy transactions with the personal carbon exchange 300. The purchase settlement entities 204 may interface with a known point of sale (POS) system 302 that communicates the purchasable item monetary cost and Carbon cost (Carbon units) to the purchase settlement entities 204.

The POS system 302 may be connected to a carbon cost database 304. The POS system 302 may send the item identifier for a particular purchasable item (a Universal Product Code, flight number, or fuel type and quantity, etc.) to query the carbon cost database 304 and receive a value for the Carbon units to be charged for the particular purchasable item that is communicated back to the POS system 302. This permits the system 200 to function even for a purchasable item that does not already have a Carbon unit/value/price assigned to that purchasable item. As shown in FIG. 3, the carbon cost database 304 may receive input from the carbon costing wiki and a certified carbon costing resource to make the Carbon cost assessment for the particular purchasable item.

Figure 4A:
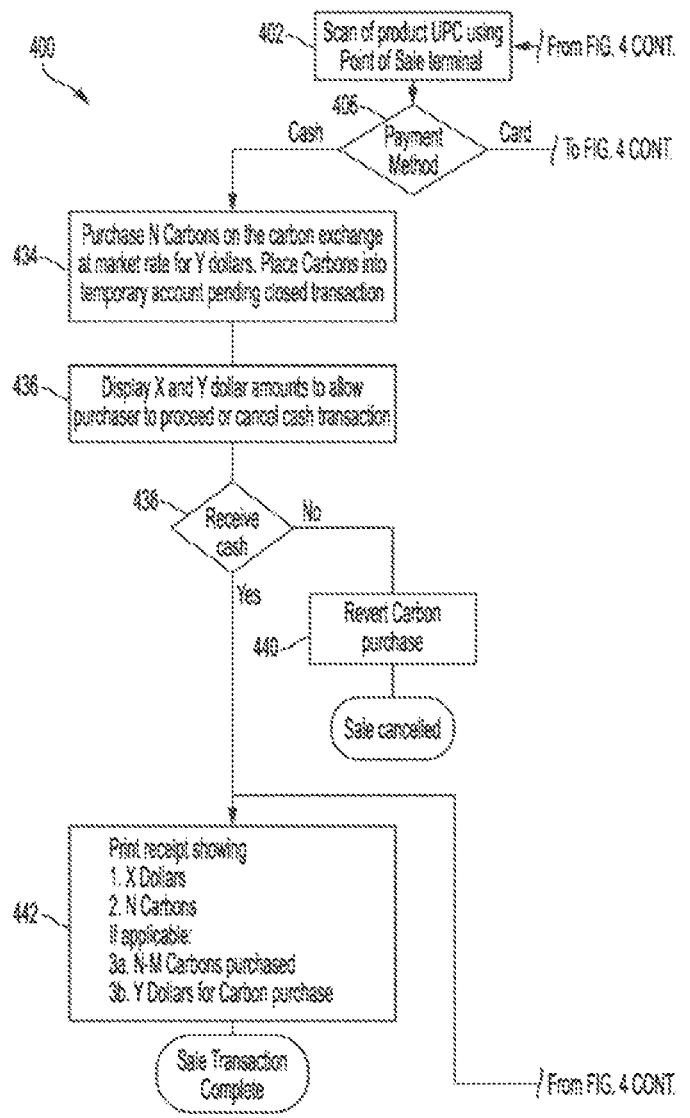
FIGS. 4A and 4B illustrate a reduce all carbon emissions method.
Figure 4B:
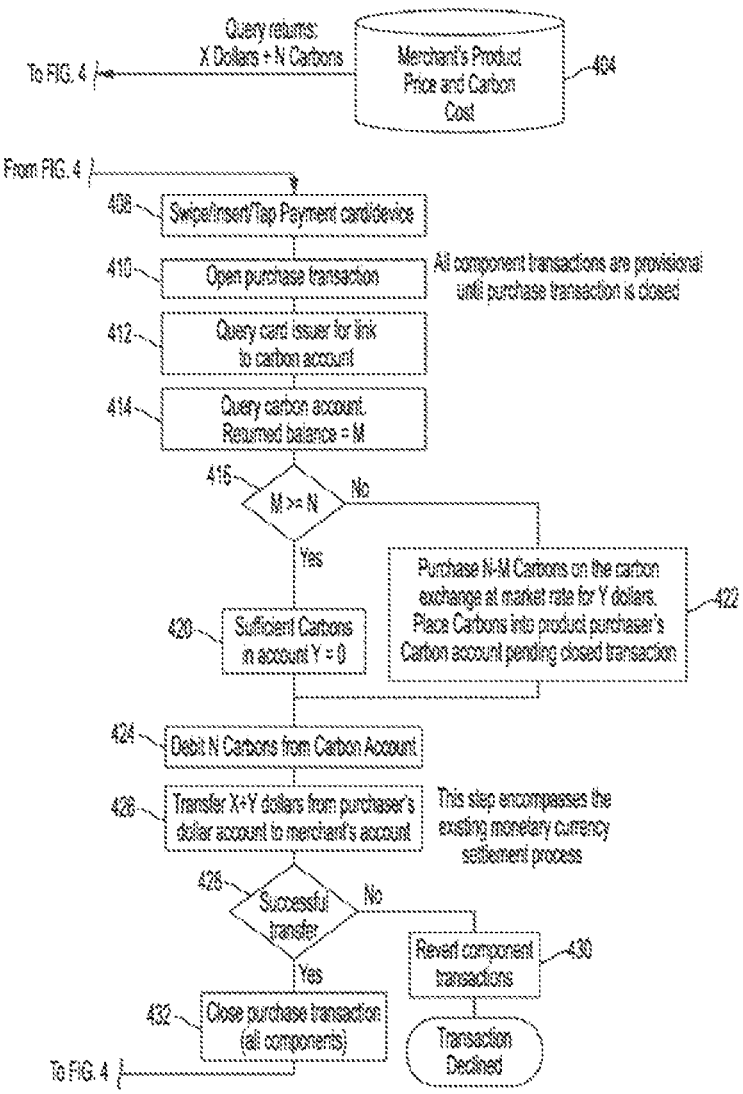

FIGS. 4A and 4B illustrate a reduce all carbon emissions method 400. The method may be performed by the system 200 shown in FIGS. 2A-3, but may also be performed using other systems that can perform the services/processes of the method 400. In the preferred embodiment, each citizen consumer is automatically enrolled into the system 200 requiring no initial opt-in or configuration by the citizen consumer, but the citizen consumer can choose to make configuration changes that optimize their usage of the system 200. The Carbon Granting Agency 210 is designated by the Federal government and places Carbons into each citizen's carbon account held at the Carbon Currency Repository (CCR) 208 on an annual (or other periodic) basis. The CCR 208 can be a government entity or it can be a private financial institution. In the system, each citizen has a single Carbon account stored in the CCR 208. Government entities and corporations (non-citizens) also have a Carbon account stored in the CCR 208. These non-citizen Carbon accounts are not funded by the Carbon Granting Agency's 210 allocation.

In the preferred embodiment, virtually all sales transactions are dual priced, including non-energy consuming products, energy consuming products, agricultural goods, energy (fuel and electricity), and transportation as described above. In an alternate embodiment, a smaller set of product sales transactions are dual priced. For example, energy and transportation.

In the method 400, a product UPC of the purchasable item may be scanned at a point of purchase, such as a POS terminal) (402) and a merchant product price and a Carbon cost (N units in one example) for the purchasable item (404) may be returned to the point of purchase. The method then determines is the purchase is being made via cash or card (406) since different processes as shown in FIGS. 4A and 4B may be performed for each method of purchase.

If the consumer uses a payment card, their monetary account and their Carbon account are linked by the system. Both accounts are debited automatically by the settlement entity 204 (card processor or financial institution). The merchant's monetary account in the monetary repository 206 is credited with the funds debited from the consumer's monetary account (following existing, established processes). The Carbons debited out of the consumer's account at the CCR 208, are recorded in a national auditing database, the Carbon Currency Audit. As shown in FIGS. 4A and 4B, the consumer may swipe/tap/insert the card into a purchase device (408) and the device opens a purchase transaction (410). The card issuer may be queried for the link to the Carbon account of the consumer (412) and the Carbon account of queried for the balance (414), such as M in this example. The method then determines if M>=N (416) which indicates that the consumer has a sufficient number of Carbons in his/her account for the purchase (420) and no buying of Carbons is needed (Y=0). A citizen consumer who pays with a payment card linked to a Carbon account will have the Carbon account automatically debited and will not be paying any monetary premium until their Carbon account reaches zero.

In the event the citizen consumer's Carbon account has insufficient Carbons to complete a transaction, the system (through their financial institution, CCR, or other entity) goes to the Carbon exchange 214 on their behalf and purchases the necessary Carbons at the current monetary cost (Y dollars) and debits their monetary account for the Carbon purchase (422). The citizen consumer's debited monetary account can be the same monetary account they use for the initial transaction or it can be a different monetary account designated by the citizen consumer for Carbon purchases. The method may then place the purchased Carbons into the account of the consumer that is purchasing the purchasable item.

In the preferred embodiment there is a fixed allocation of Carbons for each allocation period. If the citizen consumer requires credit (a loan) for a purchase, it must be denominated in monetary currency. The designated monetary account for Carbon purchases, could be a credit account (denominated in monetary currency). All of a consumer's payment cards can be linked to their single Carbon account. This applies to citizens, government entities, and corporations.

If there are sufficient Carbons or sufficient Carbons have been purchased, the method debits N Carbons from the Carbon account of the consumer (424) and transfers X (monetary price of purchasable item+Y (any dollars spent to buy Carbons) from the consumer's monetary account to the account of the merchant (426). The method then checks the monetary transfer for success (428) and if the transfer was not successful, reverts the component transactions (430) and the purchase transaction is declined. If the monetary transfer is a success, the purchase transaction is closed (432) and then the method generates a receipt for the consumer for the purchase transaction (442). The purchase receipt may show, for example, the X dollars for the purchasable item, the N Carbons and then if Carbons had to be purchased, N-M Carbons purchased and Y dollars for the Carbon purchase. The transaction using the card is then completed.

If a consumer uses cash for a purchase, the consumer will always pay an additional surcharge on their purchases to pay for the Carbon cost of the transaction since the number of Carbons in the account of the consumer is unknown for a cash transaction. This surcharge is not a tax. It is the current (spot) monetary cost of the Carbons necessary to complete the transaction (434). The merchant's settlement entity, or another entity, purchases the Carbons necessary for the transaction on the Carbon Exchange and that amount is added to the transaction cost. This surcharge would appear on the consumer's receipt. The prevailing Carbon cost is known by the system and is presented to the consumer before they make the cash transaction. In the preferred embodiment, the exchange is operated in real-time. The exchange has provisions for quoting a price and holding that price for a long enough time period to complete a transaction. In other words, the system lets consumers know what the surcharge will be before the transaction is executed.

The method may then display X (the monetary cost of the purchasable item) and Y (the dollar cost of the Carbons) to allow the purchaser to proceed or cancel the transaction (436). The method then determines if cash is received (438) and revert the Carbon purchase (440) if no cash is received and cancels the sale. If the cash is received, then the same type of receipt is printed (442) that includes the Carbons purchased and the dollar cost of those Carbons to complete the sales transaction.

Industry-Wide Consumption Tiered Pricing Method

Residential utility tiered pricing has been shown to be effective in reducing consumption by increasing unit price, in steps, as consumption increases. Tiered pricing has been applied by electric utility companies and by water utility companies. In each case, those companies enjoy an effective monopoly as the only option for a residential consumer. Because of this monopoly, these companies are typically regulated, and their pricing is controlled. To reduce overall electric consumption in a just manner, regulators and their subject utility maintain a low-price baseline tier that allows low income, and/or energy conservative, consumers to pay a low price for their electricity. This low price, if applied at all consumption levels, would lead to very high overall consumption at a low marginal profit rate for the utility. Pricing tiers can be adjusted to reduce consumption and allow the utility to generate a reasonable return on investment to their stakeholders.

If there were a single supplier of fossil fuels, a tiered pricing scheme could be used to reduce consumption in a way that rewards low-consumption users, discourages high consumption, and maintains the profit of the single supplier. In most countries, there are a multitude of competing oil companies and thus no single supplier for which the typical tiered pricing scheme can be used. Furthermore, if one company were to implement tiered pricing at their gas stations, linked to a loyalty card (or other method), they would lose a customer as soon as that customer's consumption moved them into a pricing tier higher than the price of gas at a competing gas station so that tiered pricing does not seem to be possible within a competitive industry.

An industry-wide consumption tiered pricing method overcomes the above problem. The industry-wide consumption tiered pricing method may be implemented using the system 200 in FIGS. 2A and 2B (and in particular the consumer price tier determination module 212). For illustration purposes, the retail sale of gasoline by oil companies will be used, but the concepts presented can be extended to other fossil fuel products and customers. Furthermore, the tiered pricing can also be extended to all products and services that emit Co2 in their manufacture or use as was already described above.

In the industry-wide consumption tiered pricing method, tiered pricing is implemented across all companies in an industry, or among industries. The consumption level and price at each tier can be set by regulators that may include regional or national government entities. Pricing tiers can be adjusted to reduce consumption while maintaining industry-wide profits (or multi-industry profits). The system does not impede competition within an industry. Each oil company will continue their competitive operations while enjoying their share of higher marginal prices on their sales. The system allows industry profits to be maintained as consumption is reduced.

The industry-wide consumption tiered pricing method uses the same Carbon described above that is allocated to each citizen (or resident) in the country and serves to track their consumption across all companies within an industry (or among and across multiple industries). The allocation is placed into a personal Carbon account for each citizen and, in the USA, it may be linked to social security number.

For the gas consumption example being used, a gallon of gas produces about 9 Kg of Co2 emissions (9 Carbons) when burned. Therefore, if regulators chose a baseline consumption per citizen of 1 gallon of gas a day, they would allocate 9 Carbons per day or 3,285 Carbons per citizen per year. This establishes a baseline consumption, below which the consumer will pay the lowest price. The monetary price of a gallon of gas is whatever the competitive marketplace determines (as it is today) plus the orthogonal price of 9 Carbons. When a consumer purchases gas using their payment card (or device), that card initiates the settlement of the monetary transaction (as it does today) and also causes the debit of 9 Carbons per gallon from the consumer's personal Carbon account. The system settles dual currency transactions as described above. Consumer purchases are tracked across all companies within the industry or among industries that sell products that release Co2 in their manufacture or use.

Tiered pricing can be implemented by adding a monetary surcharge based on total Carbons spent in the accounting/allocation period (yearly, monthly, etc.). For example, baseline consumption has no surcharge, consumption between baseline and two times baseline has a X % (or $Y) surcharge, etc. The surcharges can be adjusted to replace reduced industry profits. The surcharge revenue can flow directly to the selling company. Alternatively, the surcharge can be collected by a third-party and allocated to each company within the industry based on parameters from their GAAP accounting known as static tiered pricing.

In the preferred embodiment, the baseline consumption pricing is dynamically set using a Carbon Exchange (such as shown in FIGS. 2A and 2B above). Any usage beyond baseline requires the purchase of Carbons on the Carbon exchange at the prevailing price. That price is set by bid/ask on the Carbon exchange. Consumers are free to sell their Carbons at any time on the exchange as discussed above. This scheme encourages consumers to minimize consumption. Below baseline consumers enjoy a monetary reward when they sell their extra Carbons and above baseline consumers must pay the surcharge after they consume their baseline allocation. If the Carbon exchange is efficient, it is nearly a zero-sum exchange between high consumption consumers and low consumption consumers and is fair for consumers.

However, regulated reduced consumption, driven by reduced baseline Carbon allocation, will lead to falling industry profits. This is politically unpalatable, especially in democracies influenced by industry lobbying. The system allows regulators to maintain overall industry profit by placing a transaction load on the exchange that is distributed to companies within the industry (or industries). Each oil company would receive a pro-rata share of the exchange load based on parameters from their GAAP accounting. It is anticipated that regulators adjust the exchange load periodically to provide sufficient cashflow to fund this profit-replacement as consumption is reduced. Companies within an industry (or among industries) are compensated for producing less (or emitting less Co2 into the atmosphere). By replacing profit lost as a result of reduced consumption, the system aligns the profit interests of the oil industry with the overall societal interest in reducing Co2 emissions to slow climate change.

For the tiered pricing method that may be implemented using the system in FIGS. 2A and 2B, at the time of sale, the customer is identified from their payment card or device. The system displays their pricing tier and the marginal price of the product within that tier as shown in FIGS. 2 and 4. If the customer chooses to pay with cash, the system displays the price for the highest consumption tier. The rest of the settlement process as the same as already described above.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention.

Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising: a user computer system having a display that interfaces with a computer system and displays a purchasable item to a purchaser, the purchasable item having at least one component that is a scarce commodity that is sold by a plurality of vendors and has a baseline tier and a higher tier, the baseline tier having a quantity of the scarce commodity purchasable at a baseline price from any of the plurality of vendors and the higher tier having a higher price when the purchased scarce commodity quantity exceeds the baseline tier quantity; a regulator computer system, separate from the user computer system, that determines the baseline tier and the higher tier for the scarce commodity and communicates the baseline tier and higher tier for the scarce commodity to the computer system;

the computer system having a processor and a plurality of instructions executed by the processor that is configured to:

store the baseline tier and the higher tier of the scarce commodity and, for the purchaser, a predetermined quantity of the scarce commodity from an previously purchased purchasable item;

receive a transaction in which the purchaser chooses to purchase the purchasable item having a particular quantity of the scarce commodity sold by a particular vendor of the plurality of vendors;

charge, if a sum of the particular quantity and the stored predetermined quantity for the purchaser do not exceed the baseline tier quantity, the baseline price for the particular quantity of the scarce commodity; and charge, if the sum of the particular quantity and the stored predetermined quantity for the purchaser exceeds the baseline tier quantity, the higher price for the particular quantity of the scarce commodity.

2. The system claim 1, wherein the processor is further configured to determine if the particular quantity and the predetermined quantity exceed the baseline tier quantity, charge the baseline price for a portion of the particular quantity that does not exceed the baseline quantity and charge the higher price for a portion of the particular quantity that does exceed the baseline quantity.

3. The system of claim 1, wherein the scarce commodity has a plurality of tiers and wherein the processor is further configured to set a quantity and a price for each tier.

4. The system of claim 3, wherein the processor is further configured to set, for each purchaser, the same quantity and the price for each tier or to set a quantity and a price for each tier for each class of purchasers.

5. The system of claim 1, wherein the previously purchased predetermined quantity of the scarce commodity is zero.

6. The system of claim 1, wherein the scarce commodity is a greenhouse gas and the particular quantity of the greenhouse gas includes a quantity of greenhouse gas emitted during manufacture of the purchasable item and an anticipated quantity of greenhouse gas emitted during use of the purchasable item.

7. The system of claim 6, wherein the purchasable item is gasoline that emits the greenhouse gas when manufactured and burned by the purchaser.

8. The system of claim 1, wherein the processor is further configured to reset the baseline tier quantity for the scarce commodity when a rationing period has expired.

9. The system of claim 1, wherein the scarce commodity is a component in a plurality of purchasable items.

10. A method, comprising:

displaying, on a user computer system, a purchasable item to a purchaser, the purchasable item having at least one component that is a scarce commodity that is sold by a plurality of vendors and has a baseline tier and a higher tier, the baseline tier having a baseline tier quantity of the scarce commodity purchasable at a baseline price and the higher tier having a higher price when the purchased scarce commodity quantity exceeds the baseline tier quantity;

setting, by a regulator computer system that is separate from the user computer system, the baseline tier and the higher tier for the scarce commodity; communicating, from the regulator computer system to a second computer system, the baseline tier and higher tier for the scarce commodity to the computer system;

storing, in the second computer system, the baseline tier and the higher tier of the scarce commodity and, for the purchaser, a predetermined quantity of the scarce commodity from an previously purchased purchasable item;

receiving, at the second computer system, a transaction in which the purchaser chooses to purchase the purchasable item having a particular quantity of the scarce commodity sold by one of the plurality of vendors;

charging, by the second computer system when a sum of the particular quantity and the stored predetermined quantity for the purchaser does not exceed the baseline tier quantity, the baseline price for the particular quantity of the scarce commodity; and charging, by the second computer system when the sum of particular quantity and the stored predetermined quantity for the purchaser exceeds the baseline tier quantity, the higher price for the particular quantity of the scarce commodity.

11. The method claim 10 further comprising determining if the particular quantity and the predetermined quantity exceed the baseline tier quantity, charging the baseline price for a portion of the particular quantity that does not exceed the baseline quantity and charging the higher price for a portion of the particular quantity that does exceed the baseline quantity.

12. The method of claim 10, wherein the scarce commodity has a plurality of tiers and the method further comprises setting a quantity and a price for each tier.

13. The method of claim 12, wherein setting the quantity and price further comprises setting, for each purchaser, the same quantity and the price for each tier or setting, a quantity and a price for each tier for each class of purchasers.

14. The method of claim 10, wherein the previously purchased predetermined quantity of the scarce commodity is zero.

15. The method of claim 10, wherein the scarce commodity is a greenhouse gas and the particular quantity of the greenhouse gas includes a quantity of greenhouse gas emitted during manufacture of the purchasable item and an anticipated quantity of greenhouse gas emitted during use of the purchasable item.

16. The method of claim 15, wherein the purchasable item is gasoline that emits the greenhouse gas when manufactured and burned by the purchaser.

17. The method of claim 10 further comprising resetting the baseline tier quantity for the scarce commodity when a rationing period has expired.

18. The method of claim 10, wherein the scarce commodity is a component in a plurality of purchasable items.

\* \* \* \* \*